United States Patent [19]

Gaymans et al.

[11] Patent Number: 4,460,762
[45] Date of Patent: Jul. 17, 1984

[54] PREPARATION OF HIGH MOLECULAR POLYTETRAMETHYLENE ADIPAMIDE

[75] Inventors: Reinoud J. Gaymans, Enschede; Edmond H. J. P. Bour, Limbricht, both of Netherlands

[73] Assignee: Stamicarbon B.V., Geleen, Netherlands

[21] Appl. No.: 247,545

[22] Filed: Mar. 25, 1981

[30] Foreign Application Priority Data

Mar. 26, 1980 [NL] Netherlands ............ 8001764

[51] Int. Cl.$^3$ ............................................. C08G 69/28
[52] U.S. Cl. ................................... 528/335; 528/336
[58] Field of Search ................................ 528/335, 336

[56] References Cited

U.S. PATENT DOCUMENTS

| | | | |
|---|---|---|---|
| 2,130,948 | 9/1938 | Carothers | 528/335 |
| 3,676,400 | 7/1972 | Kohan et al. | 260/857 L |
| 3,840,500 | 10/1974 | Ryffel et al. | 528/335 |

FOREIGN PATENT DOCUMENTS

| | | | |
|---|---|---|---|
| 49-17036 | 4/1974 | Japan. | |
| 614625 | 12/1948 | United Kingdom | 528/335 |
| 1493497 | 11/1977 | United Kingdom. | |

OTHER PUBLICATIONS

Ogato, "Polycondensation", Article, Published 6/10/74, w/translation.
Journal of Polymer Science, Polymer Chemistry Edition, vol. 15, (1977), pp. 537–545, Gaymans et al.
Polymer Molecular Weights, Part I, Slade, 1975, pp. 1–4.

*Primary Examiner*—Harold D. Anderson
*Attorney, Agent, or Firm*—Cushman, Darby & Cushman

[57] ABSTRACT

A process is described for the preparation of high-molecular weight white polyamides, substantially consisting of units of $-[NH-(CH_2)_4-NH-CO(CH_2)_4-CO]-$, by the after-condensation of a corresponding low-molecular prepolymer, consisting substantially of a molecular chain of units of $-[NH-(CH_2)_4-NH-CO(CH_2)_4-CO]-$, in which process the prepolymer which is employed has been prepared in the presence of an excess of 0.5 to 15 moles-% of 1,4-diaminobutane with respect to the quantity stoichiometrically equivalent to the adipic acid applied. This prepolymer is thereafter subjected to the after-condensation reaction in the solid phase in an atmosphere containing water vapor.

8 Claims, No Drawings

PREPARATION OF HIGH MOLECULAR POLYTETRAMETHYLENE ADIPAMIDE

This invention relates to a method for the preparation of high-molecular weight polytetramethylene adipamide (nylon 4,6) by after-condensation, in the solid phase, of a polytetramethylene adipamide prepolymer.

It is already known to prepare various high-molecular weight polyamides by the after-condensation of the corresponding polyamide prepolymer of a lower molecular weight at a temperature below the melting point. High-molecular nylon 6 or nylon 6,6 can be prepared in this manner.

The after-condensation stage is practically always effected in an inert oxygen-free atmosphere, mostly a nitrogen atmosphere, at atmospheric or reduced pressure.

However, if it is thus tried to prepare a high-molecular weight nylon 4,6 polyamide by after-condensation of a prepolymer in the solid phase in a nitrogen atmosphere or in vacuum, it is found that while a high molecular weight product is achieved, the resulting polyamide material also suffers from the defects of, e.g., a strong discoloration which seriously impairs the usefulness it would otherwise have.

The purpose of this invention is to find a method for the after-condensation of nylon 4,6, in which process this disadvantage does not occur and so that a useful high molecular weight product can be obtained.

The present invention consists in a method for the preparation of high-molecular weight white polyamides, substantially consisting of units of $NH-(CH_2)_4-NH-CO(CH_2)_4-CO$, by the after-condensation of a corresponding low-molecular prepolymer, consisting substantially of a molecular chain of units of $NH-(CH_2)_4-NH-CO(CH_2)_4-CO$, in which process the prepolymer which is employed has a content of a cyclic end groups not exceeding 0.20 mg/cq/g of polymer and has been prepared in the presence of an excess of 0.5 to 15 moles-% of 1,4diaminobutane with respect to the quantity stiochiometrically equivalent to the adipic acid applied. This prepolymer is thereafter subjected to the after-condensation reaction in the solid phase in an atmosphere containing water vapor.

It is found that by this technique, a high molecular white polyamide nylon 4,6 product can be prepared. Such product can now be used for the valuable manufacture of objects, films and filaments.

The polyamide nylon 4,6 product thus made can be worked up by injection moulding, extrusion, moulding, melt spinning and by working up from a solution.

The homopolymer polytetramethylene adipamide (nylon 4.6) when thus correctly prepared has surprising properties, which makes it very suitable for working up to filaments, yarns and objects.

The invention is therefore substantially aimed at the preparation of nylon 4,6 homopolyamide. However, the invention also embraces the formation of nylon 4,6 polyamide wherein there may be present other polyamide units of up to 20 weight percent, derived from other polyamide-forming compounds but, i.e., consisting of at least 80% by weight of units derived from 1,4 butane diamine and adipic acid. The other polyamide-forming compounds include aliphatically-saturated lactams such as caprolactam, valerolactam, undecalactam and laurolactam, and amino carboxylic acids, and aliphatic and aromatic dicarboxylic acids, such as succinic acid, sebacic acid, isophthalic acid and terephthalic acid, and aliphatically-saturated diamines, such as particularly hexamethylene diamine or 1,4 aminomethylcyclohexane.

Generally, the prepolymer itself is prepared by heating the salt of 1,4 diaminobutane and adipic acid in the presence of the excess of 1,4 diaminobutane for some time, at a temperature of between 150° C. and 290° C., and preferably at elevated pressure. If desired, the formation of the prepolymer can be effected, if desired, in an inert solvent. A very suitable method for the preparation of such prepolymer is described in U.S. application Ser. No. 247,548, claiming the priority of Netherlands patent application No. 8001763, and filed simultaneously herewith, the disclosure of which is incorporated herein by reference. As said application states (at page 9, lines 17-18) the relative viscosity of such prepolymer is measured at 1 g. of polymer in 100 g. 96% sulfuric acid at 20 ° C. The relative viscosity is, of course, a measure of the relative molecular weight.

The required number-average molecular weight for the prepolymer is usefully between about 1000 and about 15,000. Preferably, a prepolymer with a number-average molecular weight of between about 2000 and about 10,000 is employed in the process. This prepolymer is then subjected, in solid form, to the after-condensation reaction, preferably in the form of small particles wherein the particle size distribution is not too wide. The dimensions may, for instance, range between about 1.0 and 1.5 mm or range between about 0.1 and 0.2 mm, i.e., overall from 0.05 up to 2.5 mm.

The prepolymer itself must not be discolored and must also have a relative excess of amino end groups. The number of amino end groups must preferably be at least equal to the sum of the number of carboxyl end groups and the number of any end groups of any different kind. End groups of a different kind are here understood to mean all end groups not being amino or carboxyl groups. These are substantially pyrrolidonyl end groups that may be formed by cyclisation of diaminobutane followed by polycondensation or by cyclisation of the terminal diaminobutane moiety of the chain. The amount of cyclic end groups in the prepolymer should not exceed 0.20 milligram equivalent per gram of polymer, as prepolymers with a larger amount of cyclic end groups cannot in practice be converted to high molecular weight polyamide. Preferably the amount of cyclic end groups does not exceed 0.15 mgeq/g and better yet does not exceed 0.10 mgeq/g. At a content of cyclic (pyrrolidinyl) end groups between 0.10 and 0.15 mgeq/g, the prepolymer can be converted to higher molecular weight polyamide if fairly large excess of diaminobutane has been used in its preparation. A prepolymer containing less than 0.10 mgeq/g of cyclic end groups and having a proper balance between amino end groups and carboxyl end groups will easily be converted to a high molecular weight polyamide. The above-mentioned requirement for an excess of amino end is generally complied with by starting from a prepolymer prepared while employing a definite excess of 1,4 diaminobutane (as described hereabove).

By the subsequent after-condensation of the (white) prepolymer so formed, in solid form, in an atmosphere containing water vapor, a white high molecular weight nylon 4,6 polyamide is obtained in all cases. If, by contrast, in the formation of the prepolymer only a very small exess of diaminobutane has been used, or none at all, and the amount of cyclic end groups is too high, no such polyamide with a high molecular weight is obtained.

Thus, it appears that a truly white polyamide with a high molecular weight is only to be obtained by starting from a prepolymer in which a definite excess of diaminobutane used in the prepolymer polycondensation reaction and containing at most a limited amount of cyclic end groups. This is surprising, because it would sooner be expected that the excess of diamine would tend to lower the molecular weight in consequence of the imbalance between amino groups and carboxyl groups.

The excess of 1,4-diaminobutane is preferably added already to the diamine-dicarboxylic acid salt from which the prepolymer is prepared, by using an excess of diamine in the preparation of the salt or by adding extra diamine to the equimolar salt composition. An excess of between about 0.5 and about 15 moles-% can be employed, calculated in respect of that quantity of 1,4-diaminobutane which is equimolar with the dicarboxylic acid used but preferably such excess of between about 1 and about 5 moles-%.

The after-condensation reaction is then effected in an atmosphere containing water vapor. Generally, an atmosphere containing from about 5 up to about 100% by volume of water vapor will be used.

An atmosphere consisting exclusively of steam can readily be applied, or a gas mixture consisting of at least 5% by volume of water vapor and essentially free of oxygen. Very suitable for such use are the mixtures of an inert gas, for instance, nitrogen, with hydrogen, containing preferably between 20 and 50 volume percent of water vapor. A stationary gas phase can be used, or the gas can be passed through the reactor.

The pressure at which the after-condensation is effected is of relatively minor importance and can generally be chosen anywhere between 0.001 and 10 bar, or preferably between about 0.1 and about 3 bar. For practical and economic reasons, a pressure of about 1 bar will preferably be chosen. At a reduced pressure, the reaction will proceed slightly more rapidly.

The after-condensation is then effected in the solid phase, and hence at a temperature below at least the substantial softening point of the polyamide. To diminish the duration of the after-condensation, a temperature of at least about 200° C. is desirable. Very suitable are temperatures of between about 225° C. and about 275° C.

To obtain a homogeneous product, it is further desirable to keep the polyamide particles moving under agitation during the after-condensation. To achieve this such after-condensation reaction can be effected in such equipment (already known in and of itself) as a rotating drum, in a stationary reactor provided with stirrers, or in an expanded or fluidized bed.

The duration of the after-condensation reaction depends on the ultimately desired molecular weight, the temperature, the molecular weight of the prepolymer and to some extent on the pressure employed. Preferably, such conditions are so chosen that the (number-average) molecular weight $M_n$ of the final polyamide product will be between about 15,000 and about 75,000 and more specifically between about 20,000 and about 50,000. At about 250° C., the duration of this reaction is in most cases between 2 and 12 hours. A longer time is possible as well. In order to reduce the reaction time or to reach a higher molecular weight in a certain length of time, a prepolymer containing one of the known acid catalysts for aiding amide-polycondensation reactions may be employed. Such acid catalyst may have been added before, during or after the formation of the prepolymer. Very suitable are strong inorganic acids of little or no volatility, specifically phosphoric acid.

The prepolymer may also contain usual noninterfering additives, such as pigments or matting agents, insofar as they do not disturb the after-condensation reaction. However, the addition of compounds, such as phosphines or phosphites to prevent discoloration during the after-condensation is not necessary in applying the method according to the invention.

The invention will now be elucidated by means of the following Examples without being restricted to the specific embodiments described therein.

EXAMPLE I

A prepolymer was prepared by heating dry 1,4 diaminobutane adipic-acid salt, containing a 5.4 moles-% excess of 1,4-diaminobutane, calculated with respect to the quantity of adipic acid, in an autoclave in 4 hours from room temperature to 220° C.

Subsequently, the pressure was relieved and the reaction mass was cooled, taken from the autoclave and ground to an average particle size of between 0.1 and 0.5 mm. This white prepolymer had a number-average molecular weight ($M_n$) of 2,000 ($\eta_{rel}$ of 1.25).

This prepolymer was then subjected, in fluidized form, to an after-condensation reaction by heating the same for 4 hours at 250° C. while passing through steam at a pressure of 1 bar. A white polytetramethylene adipamide nylon 4,6 was thereby obtained with an $M_n$ of 15,400. The UV-absorption, measured in an 0.5% by weight solution in formic acid at 290 nm, was 0.023.

EXAMPLE II

The method described above was repeated, starting from the same prepolymer, but now at reduced pressure. By carrying out the after-condensation at a pressure of 0.066 bar, a white polyamide with an $M_n$ of 19,000 was obtained. By carrying out the after-condensation at 0.026 bar, a white nylon 4,6 polyamide with an $M_n$ of 19,300 was obtained ($\eta_{rel}$ of 2.80, UV absorption at 290 nm 0.26).

EXAMPLE III - COMPARATIVE EXAMPLE

The method of Example I was repeated, starting from the same prepolymer, but now using ammonia instead of steam as the gas phase in the after-condensation at 1 bar. The result was that a discolored product with an $M_n$ of only 6,100 was obtained ($\eta_{rel}$ of 1.61, UV absorption at 290 nm 0.10).

When repeating the experiment, but now using nitrogen instead of steam as the gas phase, a strongly discolored product was again obtained.

EXAMPLE IV

A prepolymer was prepared by heating a dry 1,4 diaminobutane-adipic acid salt, containing an excess of 9.5 moles-% of the 1,4-diaminobutane, from room temperature to 212° C. in 220 minutes at a pressure of, at most, 15 bar.

The prepolymer was then ground in the manner described in Example I and heated in fluidized condition for 6 hours at 260° C. at a pressure of 1 bar while passing through a gas mixture consisting of nitrogen and steam (proportion by volume 3:1).

A white polytetramethylene adipamide nylon 4,6 with an $M_n$ of 25,500 was thereby obtained.

EXAMPLE V

A prepolymer was prepared by heating a dry 1,4 diaminobutane-adipic acid salt, containing an excess of 8 moles-% of 1,4-diaminobutane, to 212° C. in 220 minutes at a pressure of, at most, 17 bar. By further condensation in the manner described in Example IV, a white polytetramethylene adipamide nylon 4,6 with an $M_n$ of 21,400 was obtained.

EXAMPLE VI

A prepolymer was prepared by heating a dry 1,4 diaminobutane-adipic salt, containing an excess of 8 moles-% of 1,4-diaminobutane, in 200 minutes to 200° C. at a pressure of 13 bar at most. By further condensation in the manner described in Example IV, a white polytetramethylene adipamide nylon 4,6 with an $M_n$ of 34,700 was obtained ($\eta_{rel}$ of 4.92, UV absorption at 290 nm 0.030)

EXAMPLE VII

A prepolymer was prepared by heating a dry 1,4 diaminobutane-adipic acid salt, containing an excess of 8 moles-% of 1,4-diaminobutane, together with 0.1% by weight of phosphoric acid, calculated in respect of the total, to 200° C. in 220 minutes, at a pressure of, at most, 19 bar.

By further after-condensation in the manner described in Example IV, a white polytetramethylene adipamide nylon 4,6 with an $M_n$ of 40,900 was obtained.

EXAMPLE VIII

A prepolymer was prepared by heating a dry 1,4 diaminobutane-adipic acid salt, containing an excess of 1.3 moles-% of 1,4-diaminobutane, to 185° C. in 220 minutes, at a pressure of, at most, 13 bar. By further condensation in the manner described in Example IV, a white polytetramethylene adipamide nylon 4,6 with an $M_n$ of 26,100 was obtained.

EXAMPLE IX

A prepolymer was prepared by heating a dry 1,4 diaminobutane-adipic acid salt, containing an excess of 2.1 moles-% of 1,4-diaminobutane, to 195° C. in 160 minutes, at a pressure of, at most, 17 bar.

By further condensation in the manner described in Example IV, but now for 20 hours, a white polytetramethylene adipamide nylon 4,6 with an $M_n$ of 41,900 was obtained.

EXAMPLE X

A number of prepolymers based on diaminobutane and adipic acid and in experiment m) further containing 11-aminoundecanoic acid, were subjected to aftercondensation in the solid phase as described in Example I. The temperature and duration of the aftercondensation as well as physical data of the prepolymers and of the final polyamide product are recorded in table 1. Experiments (b), (c), (d), (e), (f) and (h) concern the prepolymers and polymers of respectively Examples VI, IV, VIII, IX, VII and I.

TABLE I

| | prepolymer | | | | | after condensation | | | |
|---|---|---|---|---|---|---|---|---|---|
| | excess DAB | [pyr] | [NH₂] | [COOH] | $\eta_{rel}$ | $\eta_{rel}$ | [pyr] | time | temperature |
| exp't | mole % | meq/g | meq/g | meq/g | | | meq/g | hours | °C. |
| a | 2.1 | 0.018 | 0.944 | 0.625 | 1.20 | 4.27 | 0.003 | 4 | 260 |
| b | 8 | 0.028 | 0.970 | 0.550 | 1.19 | 4.92 | 0.003 | 6 | 260 |
| c | 9.5 | 0.047 | 1.02 | 0.51 | 1.20 | 3.40 | 0.011 | 6 | 260 |
| d | 1.3 | 0.033 | 0.55 | 0.45 | 1.22 | 3.58 | 0.005 | 6 | 260 |
| e | 2.1 | 0.032 | 0.53 | 0.29 | 1.30 | 6.15 | 0.028 | 20 | 260 |
| f | 8.0 | 0.045 | 1.150 | — | 1.16 | 6.0 | 0.007 | 6 | 260 |
| g | 5.4 | 0.122 | — | — | 1.20 | 3.37 | 0.018 | 4 | 260 |
| h | 5.4 | 0.027 | 0.86 | 0.68 | 1.25 | 2.36 | — | 4 | 250 |
| k | 2.4 | 0.053 | 0.128 | 0.127 | 1.66 | 2.75 | 0.037 | 4 | 260 |
| l* | 2.4 | 0.263 | 0.051 | 0.193 | 1.36 | 1.71 | 0.109 | 4 | 260 |
| m** | 2.0 | 0.30 | — | — | 1.20 | 2.51 | 0.004 | 4 | 260 |

*not according to the invention
**prepolymer prepared from 80 parts by weight of 1.4-diaminobutae-adipic acid salt, 1 pbw of 11-aminoundecanoic acid and 10 pbw of water.

Determination of the Pyrrolidine Endgroups in Nylon 4.6

A glass tube containing 0.25 g of dry polyamide and 0.5 ml of 6 N hydrochloric acid is flushed with nitrogen, sealed and heated to 130° C. in an oil-bath. This temperature is maintained until the polyamide dissolves and for four hours afterwards. The tube is then cooled, with attendant formation of crystals of adipic acid, and opened. A sample for gas-chromatographic analysis is obtained by diluting 0.20 ml of the supernatant liquid with 0.70 ml of 2 N alcoholic sodium hydroxide. Analysis is carried out by bringing 1 µl of the sample on a preconditioned Chromosorb (RTM) 130 column of 1,5 m × ¼" which is heated for one minute at 150° C. and then heated to 220° C. with a heating rate of 13° C./minute. Detection is carried out by catharometer method. The pyrrolidone peak is detected after 4,5 minutes and the 1.4-diaminobutane peak after 8 minutes. The diaminobutane content of nylon 4.6 is 0.0005 mole/g. The pyrrolidine content is calculated on the basis of the ratio between the area of the diaminobutane peak and the area of the pyrrolidine peak with the formula [pyr]=5000/peak ratio, expressed in mmol pyrrolidine/g of polymer.

The procedure of Examples I, II and IV through IX may be similarly employed in the preparation of copolyamides of nylon 4,6 using as copolycondensed monomer units such additional components as caprolactam, hexamethylenediamine, sebacic acid or teraphthalic acid. It is generally observed that provided that at least 80 mole percent of the polymer units are of adipic acid and tetramethylenediamine, white prepolymers, which will readily polycondense into high molecular weight white polyamide products may then be obtained, using the after-condensation procedures of the foregoing Examples. While these products will vary in their properties with respect to homopolyamide nylon 4,6 products described in the foregoing Examples they, too, are useful in forming films, filaments and shaped articles.

Accordingly, the scope of this invention is not limited to the foregoing Examples, but only by the spirit and scope of the following claims.

What is claimed is:

1. A process for the preparation of a white, high-molecular-weight nylon 4,6 polyamide, substantially consisting of units of

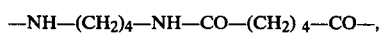

which process consists essentially in first forming a polyamide prepolymer having a number-average molecular weight $M_n$ less than about 10,000 by condensation reaction between 1,4-diaminobutane and adipic acid wherein said 1,4-diaminobutane is present in an amount of from 0.5 to 15 mole % in excess of the molar amount of said adipic acid, said polyamide prepolymer having (1) a content of cyclic end groups not exceeding 0.20 mg equivalent per g of prepolymer, and (2) wherein the number of amino end-groups at least equals the sum of both
  (i) the number of carboxyl end groups, and
  (ii) the number of any other end-groups; and thereafter after-condensing said prepolymer, (a) in the solid phase and
(b) under a water-vapor-containing atmosphere and
(c) at a temperature of at least 200° C. to obtain a white, high-molecular-weight nylon 4,6 polymer of a number-average molecular weight $M_n$ greater than about 15,000.

2. Method according to claim 1, wherein said excess is between 1 and 5 moles-% of 1,4 diaminobutane.

3. Method according to claim 2, wherein the said atmosphere contains at least 5% by volume of water vapor.

4. Method according to claim 1, wherein an acid polycondensation catalyst is also present in said prepolymer.

5. Method according to any one of claims 1, 2, 3, or 4, wherein said after-condensation is conducted at a pressure of between 0.001 and 10 bar and a temperature of between 225° C. and 275° C.

6. Method according to any one of claims 1, 2, 3, or 4, wherein the homopolymer polytetramethylene adipamide is obtained.

7. Method according to any of claims 1, 2 3 or 4 wherein the prepolymer which is subjected to after-condensation contains an amount of cyclic endgroups not exceeding 0.15 mgeq/g.

8. Method according to any of claims 1, 2, 3 or 4 wherein the prepolymer which is subjected to after-condensation contains an amount of cyclic endgroups not exceeding 0.10 mgeq/g.

* * * * *